J. G. FARIA.
AUTOMATIC TIRE REMOVER.
APPLICATION FILED OCT. 21, 1915.
1,183,180.
Patented May 16, 1916.
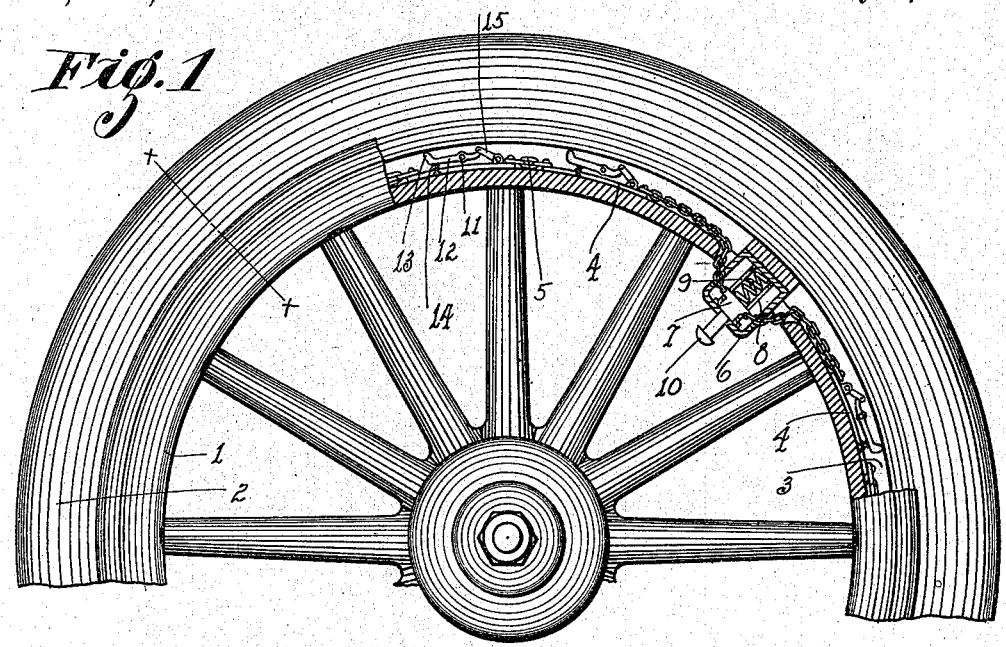
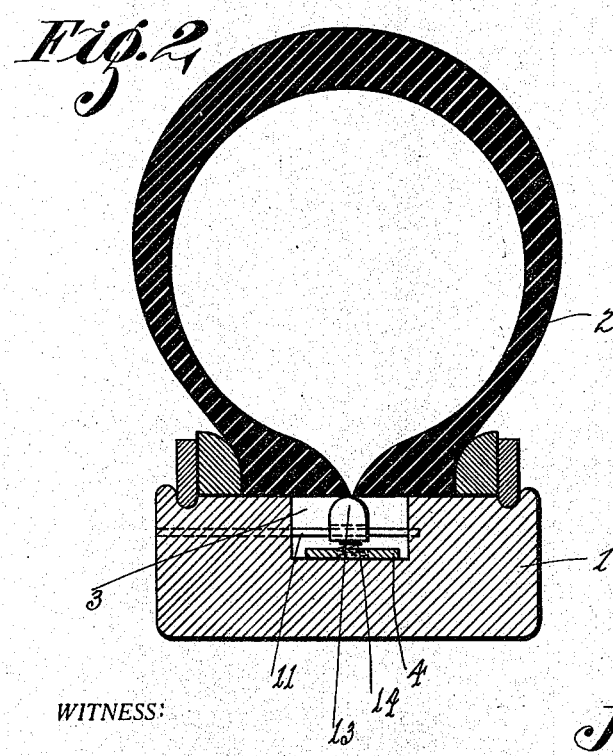
WITNESS:
Floyd M. Blanchard
INVENTOR.
Joe G. Faria
BY
ATTORNEY

UNITED STATES PATENT OFFICE.

JOE G. FARIA, OF WILLOWS, CALIFORNIA.

AUTOMATIC TIRE-REMOVER.

1,183,180.

Specification of Letters Patent.

Patented May 16, 1916.

Application filed October 21, 1915. Serial No. 57,175.

*To all whom it may concern:*

Be it known that I, JOE G. FARIA, a subject of Portugal, residing at Willows, in the county of Glenn, State of California, have invented certain new and useful Improvements in Automatic Tire-Removers; and I do declare the following to be a full, clear, and exact description of the same, reference being had to the accompanying drawings, and to the characters of reference marked thereon, which form a part of this application.

This invention relates to improvements in paraphernalia used in connection with pneumatic tires, the object of the invention being to produce a device carried by the felly or rim of the wheel whereby by a simple pressure of a button, the tire may be lifted for its entire circumference away from the felly or rim allowing it to be readily removed.

As is a well known fault with most pneumatic tires, they have a tendency to stick to the felly or rim, especially after they have been in place a long time and it is sometimes very hard to dislodge them, and it is the aim of my invention to overcome this inconvenience.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 1 is a side elevation of a portion of the wheel and tire showing the same partly broken out and in section to illustrate the application of my improved invention thereto. Fig. 2 is a sectional view taken on a line $x$ $x$ of Fig. 1.

Referring now more particularly to the characters of reference on the drawings, the numeral 1 designates the felly or rim which carries the pneumatic tire 2. In providing my improved invention, I first form, in the outer periphery of the felly or rim, a groove or channel 3 which extends around the entire circumference of the felly or rim.

My invention comprises primarily a plurality of flat plates or bars 4 which are arranged within the length of the channel 3 and are flexibly connected at their ends by small chains or links 5. At one point the chains 5 are divided to project into a small housing 6 fitted into the felly or rim. Within this housing the chains are connected with a small piston 7 working in guide grooves 8 against the pressure of the spring 9. On the piston 7 is a pin and button 10 which projects outside of the casing 6. By pressing on the button 10, this action will tend to draw the chains 5 which are connected with the piston 7 together and this will draw all of the members 4 and 5 together toward the casing 6. This action operates the releasing levers of my device which are constructed and are operated as follows, viz: Adjacent each of the members 4 are one or more pins 11 projecting across from the sides of the channel 3. Journaled on each of the pins 11 is a releasing lever 12 which is provided with an upwardly projecting pressure plate 13 normally extending adjacent the inner circumference of the tire 2. Each member 13 is normally held away from frictional engagement with the tire 2 by means of a pull spring 14 which is connected with the lever 12 and with the bottom of the channel 3 with a normal tendency to pull the lever 12 downwardly. Each lever 12 is on its end, opposite to the end on which is the member 13, connected by the link 15 with one of the plates 4. When the button 10 is pressed and the members 4 and 5 are all pulled around the circumference of the bottom of the channel 3, these links 15 all pull on one end of the levers 12, and this action moves such levers 12 on their pivotal points 11. This action throws the releasing plates 13 into frictional engagement with the inner circumference of the tire 2 and forces the same away from the felly or rim allowing it to be then readily removed. When the button 10 is released, the spring 9 forces the piston 7 to normal position and this leaves the members 4 and 5 free. The action of the springs 14 can then readily pull all the parts to normal passive position, so that the tire can again be placed on the felly or rim if desired.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device of the character described comprising the combination with a felly or rim arranged to receive a pneumatic tire, of means arranged for pressing the tire circumferentially away from the felly or rim, such means comprising a plurality of pivoted levers arranged within the felly or rim and having members adapted to be brought into engagement with the tire, and means for moving said levers to cause said members to engage the tire as described.

2. A device of the character described comprising a combination with a felly or rim provided with a circumferential channel of a plurality of plates linked together and arranged for circumferential movement within the channel, means controlling the movement of said plates, and a plurality of spring pulled levers pivotally mounted within the channel and linked to said plates as described.

In testimony whereof, I have affixed my signature.

JOE G. FARIA.

Copies of this patent may be obtained for five cents each, by addressing the "Commissioner of Patents, Washington, D. C."